(12) United States Patent
Szyperski et al.

(10) Patent No.: US 8,307,016 B2
(45) Date of Patent: Nov. 6, 2012

(54) ACCESSING DIFFERENT APPLICATION DATA VIA A COMMON DATA STRUCTURE

(75) Inventors: Clemens A. Szyperski, Redmond, WA (US); Quetzalcoatl Bradley, Monroe, WA (US); Joshua R. Williams, Seattle, WA (US); Christopher L. Anderson, Redmond, WA (US); Donald F. Box, Bellevue, WA (US); Jeffrey S. Pinkston, North Bend, WA (US); Martin J. Gudgin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 12/036,433

(22) Filed: Feb. 25, 2008

(65) Prior Publication Data

US 2009/0216778 A1 Aug. 27, 2009

(51) Int. Cl.
 *G06F 7/00* (2006.01)
(52) U.S. Cl. ...................................................... 707/809
(58) Field of Classification Search .................. 707/790, 707/803, 804, 809; 370/469; 726/4, 27
 See application file for complete search history.

(56) References Cited

U.S. PATENT DOCUMENTS

| | | |
|---|---|---|
| 6,694,357 B1 | 2/2004 | Volnak |
| 6,704,747 B1 | 3/2004 | Fong |
| 7,233,952 B1 | 6/2007 | Chen |
| 7,263,717 B1 * | 8/2007 | Boydstun et al. ................. 726/4 |
| 7,266,535 B1 | 9/2007 | Nelken et al. |
| 7,296,022 B2 | 11/2007 | Harjanto |

| | | |
|---|---|---|
| 2003/0140058 A1 | 7/2003 | Martin et al. |
| 2004/0249854 A1 | 12/2004 | Barnes-Leon et al. |
| 2005/0036513 A1 * | 2/2005 | Clarke ........................ 370/469 |
| 2005/0114355 A1 * | 5/2005 | Nuttila ........................ 707/100 |

(Continued)

FOREIGN PATENT DOCUMENTS

WO WO2007/067248 A2 6/2007

OTHER PUBLICATIONS

"Universal Data Model Platform: the Data-Centric Evolution for System Level Codesign," by Kun Tong, Jinian Bian and Haili Wang, 2006 IEEE, Proceedings of the 10th International Conference on Computer Supported Cooperative Work in Design [online] [retrieved on Dec. 20, 2007], 6 pgs. Retrieved from the Internet: http://ieeexplore.ieee.org/Xplore/login.jsp?url=/iel5/4019031/4019032/04019134.pdf?tp=&isnumber=&arnumber=4019134.

(Continued)

*Primary Examiner* — Hung T Vy
(74) *Attorney, Agent, or Firm* — Workman Nydegger

(57) ABSTRACT

A common data type structure can be used to correlate access requests between applications that implement data in accordance with different types or type structures. In one implementation, a common data structure includes schemes for operations, sequences, records, and atoms (i.e., undefined). The system can then map any type structure to the schemes of the common data structure. In operation, a request for data by an application can involve identifying one or more proxies used by an application to map the data to the common data structure. The proxies map the data to the common data structure based on the shape of the data (to the extent it can be identified). The proxies then can return one or more data structures that comprise the identified mapping information. The application can then perform operations directly on the received data structures.

13 Claims, 4 Drawing Sheets

U.S. PATENT DOCUMENTS

| | | |
|---|---|---|
| 2005/0149552 A1 | 7/2005 | Chan et al. |
| 2005/0187980 A1 | 8/2005 | Carlin et al. |
| 2007/0156737 A1 | 7/2007 | Barnes et al. |
| 2007/0276786 A1 | 11/2007 | Piedmonte |

OTHER PUBLICATIONS

"The UDM Framework," by Arpad Bakay and Endre Magyari, Institute for Software-Integrated Systems, Vanderbilt University, Oct. 2004, [online] [retrieved on Dec. 20, 2007], 96 pgs. Retrieved from the Internet: http://www.escherinstitute.org/PIone/tools/suites/mic/udm/UDMAPI.pdf.

"Physically Implementing Universal Data Models to Integrate Data," by Len Silverton, Sep. 2002, DM Review Magazine, [online] [retrieved on Dec. 20, 2007], 8 pgs. Retrieved from the Internet: http://www.dmreview.com/issues/20020901/5675-1.html.

* cited by examiner

ACCESSING DIFFERENT APPLICATION DATA VIA A COMMON DATA STRUCTURE

CROSS-REFERENCE TO RELATED APPLICATIONS

N/A

BACKGROUND

Background and Relevant Art

As computerized systems have increased in popularity, so have the various application programs and documents used on the computerized systems. In particular, there are now a wide range of applications programs configured for any number of purposes, whether to function as complex operating systems, databases, and so forth, or to function as more simple application programs configured for a narrow purpose. In many cases, software developers will write new application programs with a particular operating system/framework in mind, using any number of appropriate programming languages. Once the software is complete, the developer will compile the application into machine-executable code, which can then be installed on a computer system with the appropriate operating system. In many cases, operating the new application program will involve interoperation with several other components or applications in the system/framework.

One will appreciate, therefore, that there are a number of considerations that often must be taken into account by developers of operating systems or generalized frameworks as well as developers of the individual application programs operating within the framework. Many of these interests may even be competing. For example, many application program developers may have interests related to fast and customizable operation, while many operating system/framework developers may have interests related to security and stability. In some cases, the security and stability requirements can restrict the speed and customizability of the way some application programs operate.

One area in which this tension can be apparent is with certain kinds of "type frameworks." In a type framework, functions, arguments, and even data values may be correlated with a specific "type," which generally defines how various data (i.e., functions, arguments, or values) need to appear before another application or component can access/process the corresponding data. In a system employing a strong type framework, the framework may be configured so that applications or components using one type are prohibited from executing or accessing functions and data corresponding to other types. Some example frameworks include nominal (or nominative) and structural type frameworks, although there are may different kinds of type frameworks.

In general, nominal (or nominative) type frameworks are configured so that data in one nominal type can only access (or be accessed by) other data that use the exact same type names (are of the same nominal type). Thus, one application that uses a type name called "customer record" might be prohibited from accessing similar data managed by another application program under a type name called "member record," even though the type structure (e.g., numbers and names of record fields, etc.) might be identical. For example, structural identity might occur where both of the nominal types of customer record and member record include an equal number and kind of fields (e.g., a set including: first name="string," and second name="string," etc.) In contrast, structural type frameworks rely on matches between structures, rather than names. While structural types are not limited to inexact type names, structural mismatches can occur when one of the types includes more or different kinds of structures than another type (e.g., member record includes first name="string," second name="string," and phone number=value).

Often, there are various workarounds to mismatches between various different types, including nominal and structural types so that applications can interoperate. Within a nominal type framework, for example, a developer can write new code for each application of interest that maps or converts type structures in one nominal type to identical type structures in another nominal type. Although a similar workaround between mismatched type structures is also possible, such conversion of structural types tends to be more complex. For example, the Lisp programming language implements one common, conventional structural type framework, where the basic structure is the data pair. To use data of another application program, therefore, a Lisp-based application will typically need to convert data structures in the other application into a data pair structure, which can be difficult.

Similarly, it can be difficult to convert from a Lisp data pair structure to another type structure in another application. This is true not only for differences in how data are arranged in Lisp, but also since the values of the Lisp data pair are often difficult to ascertain without a computationally expensive, complete traversal of the data pairs. This is partly because Lisp data pairs tend not to provide very much information via a basic query other than that the data pair are a "sequence." The Lisp programming framework, however, is not the only language that can present problems with different type structures. Other common languages that each use their own different structural type frameworks include XML, SQL, .NET, and JAVA, and interoperation often means some type structure conversion.

Accordingly, one way of ensuring interoperability between application programs is for application developers working on a similar platform to agree in advance to the details of nominal and/or type structures, as applicable. Of course, such rigid and precise agreement is not always possible, and provides little flexibility for other developers who may create components that will be used in the same system at a later time. Thus, developers often end up trying (as previously described) to write one or more interfaces that convert or otherwise map data in newer application types to data in another application type. For example, a developer writing an application written in one structural type framework may need to write one adaptor for other applications written in the Lisp programming language, and/or potentially also a separate adaptor for applications written in each of the XML, SQL, .NET, and JAVA programming languages.

One will appreciate that this means that the developer of the new application program will need to know (or learn) about the types used in the other programs. With fewer applications to consider, this problem may be more of a minor inconvenience. More commonly, however, this kind of scenario becomes exponentially problematic for many developers, particularly as the number of application programs that use similar or identical kinds of data (e.g., membership records, functions, etc.) on a system can grow. This problem can be further exacerbated since each of the various application programs can change or go through various upgrades, which may result in still further changes in type names and/or structures.

Accordingly, there are a number of difficulties with type-based frameworks that can be addressed.

BRIEF SUMMARY

Implementations of the present invention provide systems, methods, and computer program products configured to provide access by one application or component to any data of virtually any other application through a common/universal data structure. In one implementation, for example, a request for data by one application involves the initiation of one or more proxies that can map another application's data to one or more schemas in a common data structure. The requesting application can then interact with the requested data through a returned data structure (of mapping information) created by the proxies. As a result, each application in the system can interoperate, regardless of whether they are necessarily aware of the common data structure in advance, and thus whether they have already configured their data in accordance a specific type structure used by other applications.

Accordingly, a method from the perspective of the overall system can involve receiving one or more access requests from an application for data maintained by one or more different applications. In this case, the requested data correspond to one or more different type structures. The method can also involve identifying one or more proxies corresponding to the one or more different applications. In addition, the method can involve mapping the requested data to a common data structure using the identified one or more proxies. The identified one or more proxies create a mapped data structure that maps the requested data to the common data structure. Furthermore, the method can involve providing the mapped data structure to the requesting application.

In addition, a method from the perspective of an application can involve sending one or more access requests for data corresponding to one or more different type structures. The method can also involve receiving one or more mapped data structures that comprise mapping information between the requested data and one or more structural types of a common data structure. In addition, the method can involve requesting one or more actions on the one or more mapped data structures. In this case, the requested one or more actions are translated to the data of the one or more different type structures. Furthermore, the method can involve receiving one or more confirmations that the requested one or more actions have been completed on the requested data corresponding to the one or more different type structures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to provide access by one application or component to any data of virtually any other application through a common/universal data structure. In one implementation, for example, a request for data by one application involves the initiation of one or more proxies that can map another application's data to one or more schemas in a common data structure. The requesting application can then interact with the requested data through a returned data structure (of mapping information) created by the proxies. As a result, each application in the system can interoperate, regardless of whether they are necessarily aware of the common data structure in advance, and thus whether they have already configured their data in accordance a specific type structure used by other applications.

Accordingly, and as will be understood more fully herein, at least one implementation of the present invention relates to providing a common data structure (or "universal data model"). The common data structure/universal data model, in turn, defines or otherwise classifies data in any application in the system by data shape in terms of an "Atom," a "Sequence," a "Record," or "Operation." This classification system can be used not only at the point at which a developer is developing an application, but also even at runtime, even if the given application's data is not classified or configured strictly in accordance with the common data structure, or a type structure used by another application.

One will appreciate that this system, therefore, can be widely extensible, and can be present or otherwise used within a number of different frameworks. For example, implementations of the present invention can be easily configured or otherwise extended for use within a common language runtime ("CLR") environment, and/or with respect to any specific language frameworks. For example, at least one implementation of the present invention is also particularly applicable to applications based on XML. In actuality, virtually any language or runtime environment can be used, so long as the shape of underlying data can be determined at some point.

Figure 1A:
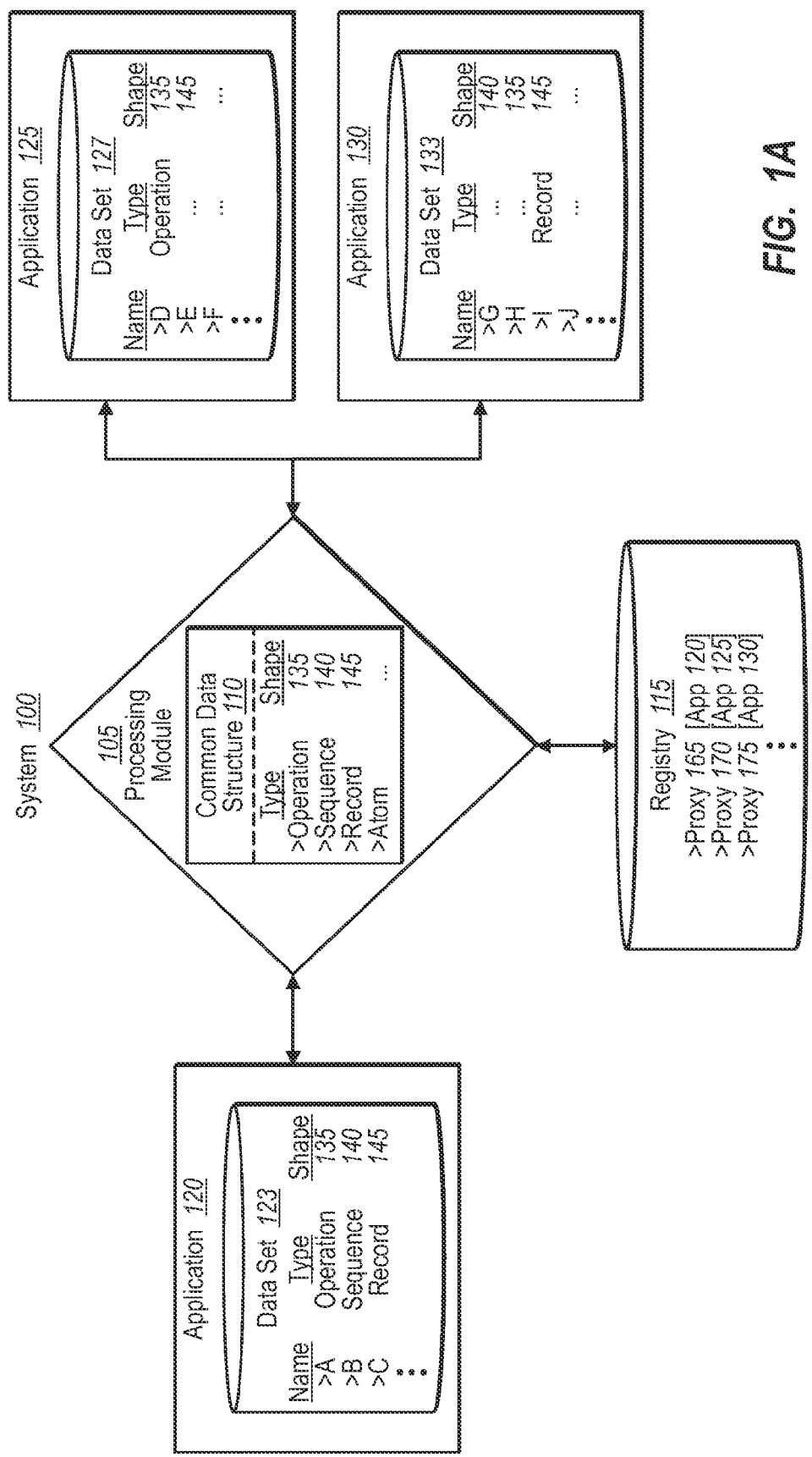
FIG. 1A illustrates an overview schematic diagram in accordance with an implementation of the present invention in which one or more application programs implementing one or more different type structures interoperate through a common data structure.

FIG. 1A illustrates an overview schematic diagram in accordance with an implementation of the present invention in which one or more different applications or components in system 100 interact with each other via a common data structure. For example, FIG. 1A illustrates a system 100 comprising one or more processing modules 105, which further comprise one or more references to a common data structure (or "universal data model") 110. In at least one implementation, system 100 comprises a generalized structural type system configured within a sub-space of nominal type environment. For example, system 100 can comprise a common structural type system that is implemented within a CLR-based nominal type environment.

In addition, FIG. 1A shows that common data structure 110 comprises one or more schemas that define certain structural types and schemas that correlate with specific, data "shapes." As also understood more fully herein, a data "shape" refers to the basic, identifiable features of a data element that can be used to broadly categorize the data element in terms of the common data structure 110. For example, FIG. 1A shows that common data structure 110 comprises a structural type schema for operations, which have a data shape 135, a structural type schema for sequences, which have a data shape 140, and a structural type schema for records, which have a data shape 145. FIG. 1A also shows that the common data structure 110 further classifies a structural type schema for an "atom," which is essentially anything that has an undefined data shape (i.e., "- - - ").

In general, an "operation" refers to any set of one or more data elements that have a data shape that identifies the data as a function or argument that returns a result when executed or processed, whether individually or as part of any set of other functions. In at least one implementation, for example, an operation can be construed essentially as the core, invokeable piece of data. With respect to CLR, when mapping CLR instances into the common data structure 110, "methods" and "delegates" can be interpreted as operations. Operations in a CLR environment can thus be construed as a delegate that takes an unspecified number of "StructuredValue" parameters, and returns a "StructuredValue." In at least one implementation, a StructuredValue is a specific nominal type that is provided as a helper to classify instances in code that operate on structured values. Additionally, the type StructuredValue can be used as a marker type on APIs (application program interfaces) which specifically expect to operate on values which have been introduced into the structured values space.

In addition, a "sequence" refers herein to data having the data shape of any set of one or more (unordered) collection of values. With respect to a CLR environment, for example, a sequence can be construed as an unordered collection of "StructuredValues." In general, a sequence comprises values that have not been separately labeled, or for which labels or names are either not unique per each value, or are otherwise insufficient to distinguish the values in the collection from the perspective of system 100.

By contrast, a "record" comprises data having the shape of a collection of values, much like a sequence, except that the values in a record have a further shape characteristic of being associated with one or more unique labels, such as one or more unique field names. In at least one implementation of a CLR environment, for example, a record can be construed as a set of named members (which themselves each have a value which is some "StructuredValue"), and a flag indicating whether or not the record is read only. In such an environment, therefore, one can appreciate that records and sequences can be construed as the primary mechanisms for expressing data shape.

Of course, notwithstanding the foregoing description(s), one will appreciate that any reference herein to any particular component, function, or operating environment that may appear to have some specific use in one particular operating system or application program is by way of descriptive convenience. In particular, one will appreciate from the specification and claims herein that implementations of the present invention can be practiced in a wide range of operating environments and operating systems and/or frameworks/environments. Thus, limitations to any specific operating system or application program should not be construed.

In any event, FIG. 1A also shows that system 100 comprises one or more applications or components 120, 125, and 135, which, as discussed more fully herein, ultimately benefit from the common data structure 110. For example, FIG. 1A shows that each of applications 120, 125, and 130 comprise one or more data sets 123, 127, and 133, respectively, which may or may not correspond to one of the schemas of common data structure 110. In particular, FIG. 1A shows that application 120 comprises a data set 123, which includes data elements A, B, and C. In this case, data elements A, B, and C correspond respectively to the structural types of an operation, a sequence, or a record, at least in part based on corresponding data shapes 135, 140, and 145, respectively.

By contrast, FIG. 1A also shows that applications 125 and 130 also comprise data sets, though the type structures and data shapes are not as clearly defined in terms of common data structure 110. For example, FIG. 1A shows that application 135 comprises a data set 127 of data elements D, E, and F. Of these, only data element D is known to correspond with the structural type of "operation," based on a data shape 135. In particular, FIG. 1A shows that data element E has a data shape 145, and E has not yet been associated with a particular structural type. Similarly, data element F is neither associated with a structural type, nor comprises a known data shape.

In addition, FIG. 1A shows that application 130 comprises a data set 133 that includes data elements G, H, I, and J. Of these, data elements G, H, and I have an identifiable data shape 140, 135, and 145, respectively. As illustrated, however, only data element I has been identified as corresponding to a record structural type. Furthermore, FIG. 1A shows that data element J has neither an identified structural type, nor an easily identifiable data shape.

One will appreciate, therefore, that the differences in what is identified from a structure/type perspective in the various data elements of applications 125, and/or 135 (compared with application 120) can depend on several factors. With respect to application 120, for example, the developer may have created application 120 with common data structure 110 in mind, and with knowledge of the required schemas, and thus declared data elements A, B, and C with the appropriate structural types. Thus, at installation of application 120, processing module 105 could be configured to immediately identify that data elements A, B, and C each correspond to the illustrated types and data shapes for common data structure 110.

By contrast, the developers of applications 125 and/or 130 may have created applications 125 and/or 130 in the beginning using certain well-defined data shapes, but declared specific structural types based on other, different type frameworks. Thus, at installation, or some other point where the data were identified by system 100, applications 125 and 130 may not have specifically provided the type structure identities (or system 100 did not identify the type structures) corresponding to the common data structure 110. Alternatively, applications 125 and 130 may have been developed with common data structure 110 in mind, but, for one reason or another, data elements D-J have not yet been identified by processing module 105 and/or correlated with a particular structural type.

In general, there are a number of ways that the structural types can be associated with a particular data element. For example, an application could be configured to publish its associated type structures and data element shapes to the processing module 105, such as at installation. Similarly, an application could simply respond to processing module 105 (e.g., during installation, or during runtime) with one or more messages identifying that the data (i.e., data set 123) managed by the given application conform with common data structure 110. At least one advantage of implementations of the present invention, however, is that much or all of this information can be determined at runtime using one or more proxies (e.g., 165, 170, 175). For example, FIG. 1A shows that system 100 comprises a registry 115 of proxies, which in this case includes at least proxy 165 based on application 120. FIG. 1A also shows that registry 115 includes proxy 170 based on application 125, and proxy 175 based on application 130.

By way of explanation, a "proxy" refers to a set of one or more computer-executable instructions that are called in system 100, and used to interface with specific applications. In one implementation, these proxies can exist as already-compiled, executable instructions that can be called at virtually any time. In additional or alternative implementations, however, these proxies can comprise a form of intermediate language code, which is provided by the system 100, and, when called, is first compiled and then executed. In either case, one will appreciate that the proxies can be fairly application-specific, such as being written in a particular program language appropriate for the given application program. For example, the given proxies can be configured specifically for programs written in XML, SQL, Lisp or the like. In at least one implementation based on CLR, for example, a proxy known as "ClrStructureServices" can be configured to represent CLR instances for "StructuredValues."

These proxies can be created by an application developer or simply provided by the system 100. For example, an application developer (of applications 120, 125, 130, etc.) can prepare one or more proxies specific to that given application, and register that proxy at installation of the application. In some cases, this might be preferable for some developers since an application developer might be in a better position to ensure that the proxy avoids overly categorizing data elements as undefined "atoms," if at all. In other cases, however, the application developer may prepare their data at least partly in line with the shapes defined within the structural types of the common data structure 110, and, as such, the developer may prefer the convenience of using a default proxy.

In general, each proxy is configured so that, when executed, the given proxy traverses one or more data structures or elements maintained by an application (120, 125, 130, etc.) Upon traversal, the proxies are configured at a minimum to identify the "shape" of various data elements. As understood from the foregoing, this means that the proxy code will typically be configured to identify if a data element maintained by an application is a function or argument conforming to certain minimum properties (e.g., returns a result). The same proxy will usually also be configured to identify if certain data elements form a collection of values, and/or if those values comprise any additional labeling that might categorize the data elements as a sequence or a record, such as described herein for the common data structure 110 schemas.

Figure 1B:
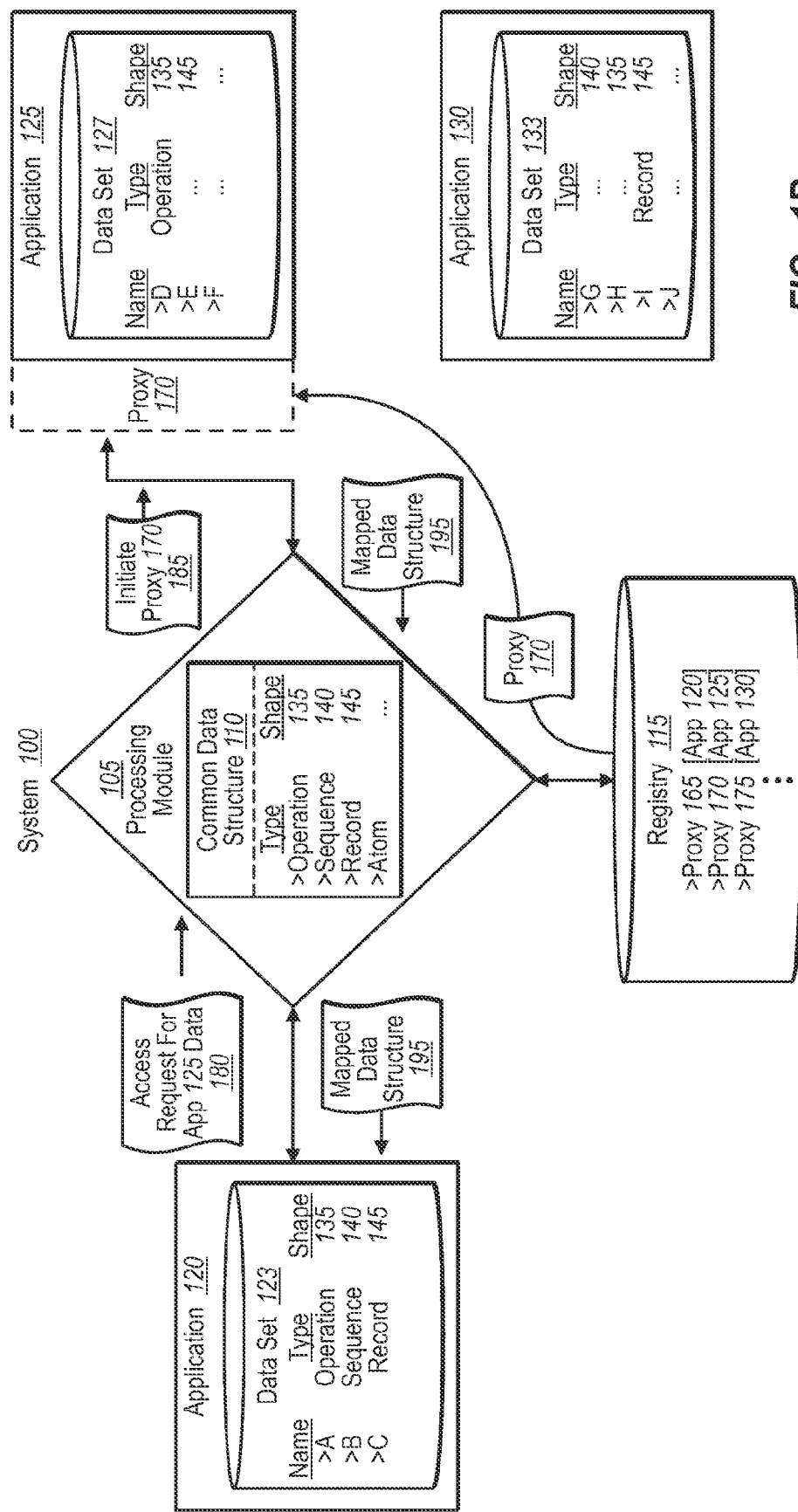
FIG. 1B illustrates the schematic diagram of FIG. 1A in which a proxy is initiated to map data to the common data structure.

FIG. 1B illustrates an overview schematic diagram in which system 100 provides application 120 access to data in one or more applications 125 and 130 with the aid of one or more proxies. For example, FIG. 1B shows that application program 120 sends one or more data access requests 180 to request access of data maintained by application 125. This request is handled by the system 100, such as via processing module 105. Since the request involves data corresponding to disparate/incompatible type structures (compared with application 120), FIG. 1B then shows that processing module 105 consults the proxy registry 115 to identify what proxies should be used to map the application 125 type structures back to common data structure 110. Accordingly, FIG. 1B shows that processing module 105 identifies that proxy 170 correlates with application 125, and initiates proxy 170 via request 185 (i.e., during runtime).

In addition, FIG. 1B shows that proxy 170 is initialized with respect to application 125. In at least one implementation, proxy 170 then begins to traverse each of the different data elements D, E, F, etc., in order to identify any structural type identities, as available, and/or to identify the data shape for each data element. In at least one implementation, for example, proxy 170 identifies that data element D comprises an operation as understood within the structural type framework for common data structure 110. In addition, proxy 170 can determine that data element E has a data shape 145, which is consistent with the shape used in the structural type for a record in common data structure 105. Furthermore, proxy 170 may be unable to identify any structural type of data shape with data element F, and thus assigns data element F as an atom.

Upon finishing this traversal and mapping of data elements, proxy 170 then returns one or more data structures that map the traversed (or requested) data elements back to the common data structure. For example, FIG. 1B shows that proxy 170 sends mapped data structure 195 through processing module 105. Processing module 105 then passes the mapped data structure 195 to application 120. In additional or alternative implementations, processing module 105 simply returns a message to application 120 indicating that a mapped data structure 195 has been created, and further provides one or more references that application 120 can use to access the mapped data structure 195. Application 120 then performs one or more actions on the data in application 125 using the mappings of mapped data structure 195.

Figure 2:
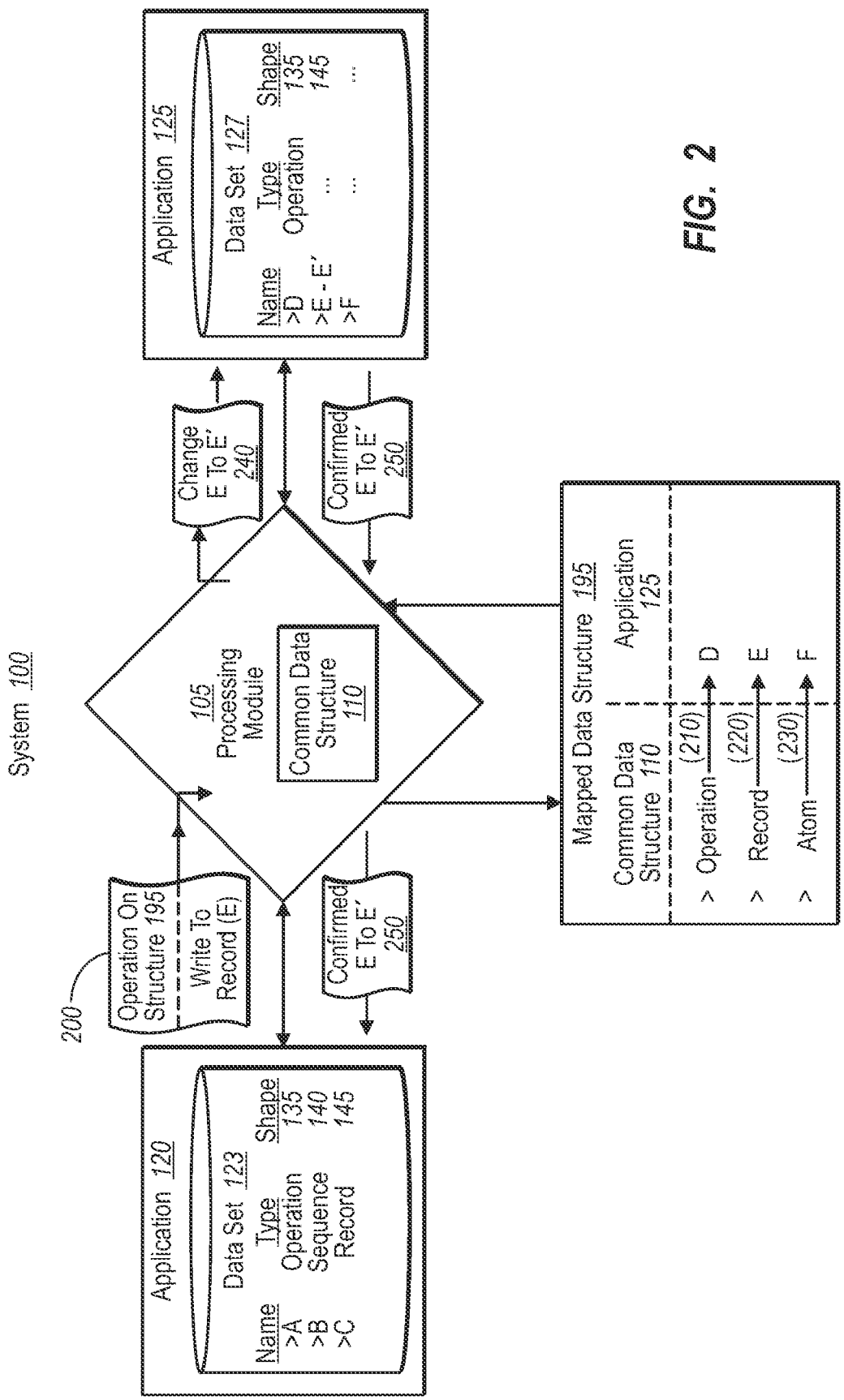
FIG. 2 illustrates the schematic diagrams of FIG. 1A-1B in which an application interoperates with data in another application through a mapped data structure.

For example, FIG. 2 illustrates at least one instance in which application 120 interoperates with the data of application 125 through the mapped data structure 195. For example, FIG. 2 shows that the mapped data structure 195 comprises a mapping or correlation information between the common data structure schemas and the data elements of application 125. In particular, FIG. 2 shows that the mapped data structure 195 comprises a mapping 210 that defines or correlates data element D as an operation. In addition, FIG. 2 shows that the mapped data structure comprises a mapping 220 that defines or correlates data element E as a record, and a mapping 230 that defines or correlates data element F as an atom. Application 120 can then manipulate or use the data of application 125 by referring to these various mappings.
NULL For example, FIG. 2 shows that application 120 sends request 200 to processing module 105. In this case, request 200 comprises a request to write to record E, changing record E to "E'." To process this request, FIG. 2 shows that processing module 105 handles request 200 via reference to mapped data structure 195. In one implementation, this means that processing module 105 combines the request 200 with mapping information 220 and sends a new request (or modified form of request 200) to application 125. For example, FIG. 2 shows that processing module 105 passes request 240 to application 125. Since application 125 understands the mapping information 220 included in request 240, application 125 can understand and process the request to change data element E from application 120.

As such, application 125 processes the request, and then sends confirmation back through the communication channel. For example, FIG. 2 shows that Application 125 prepares and sends response 250, which confirms that data element E has been changed to E', as requested. In one implementation, this involves sending message 250 to processing module 105, which then forwards the message to application 120. As a result, application 120 has manipulated one or more data elements managed by application 125 without having intimate knowledge of the type conventions used by application 125.

Accordingly, FIGS. 1A, 1B and 2 illustrate a number of different schematics, components and diagrams for processing data between applications virtually regardless of specific structural type assignments in the data. Rather, all that need be considered are the most basic shapes of the data in order for applications to interoperate with each other. One will appreciate that this can provide developers with a much greater flexibility, such as that typically more common with loosely typed systems (i.e., not having to worry about specific type conventions), albeit maintaining the important performance and security advantages of a strongly typed system.

Figure 3:
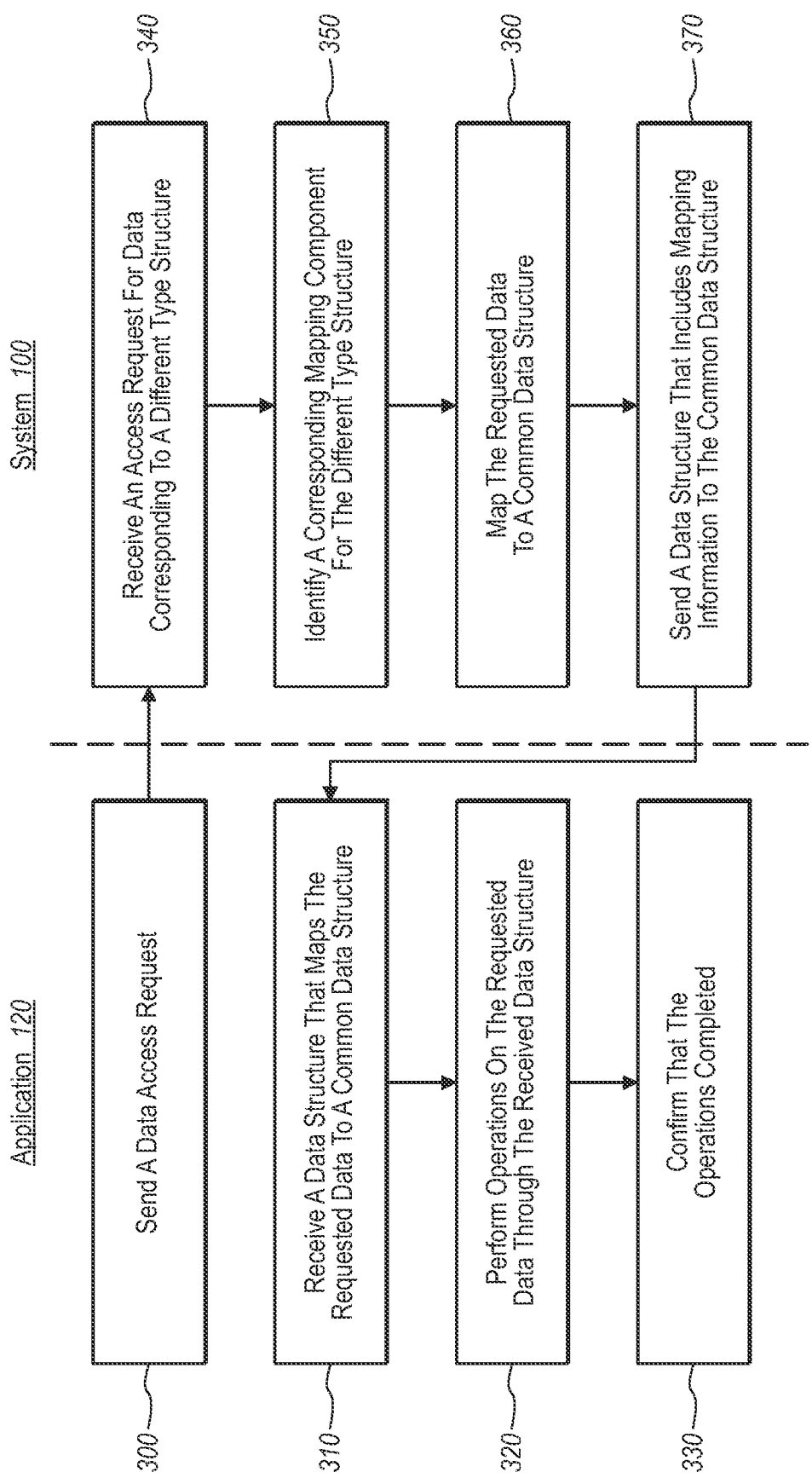
FIG. 3 illustrates flow charts of methods from the perspective of an application program and the overall system for accessing data or otherwise providing access to data of different structural types using a common data structure.

In addition to the foregoing, implementations of the present invention can also be described in terms of methods comprising one or more acts for accomplishing a particular result. For example, FIG. 3 illustrates flow charts from the perspective of an application program 120 and of system 100 for accessing or otherwise providing access to data corresponding to different structural types using a common data structure. The acts illustrated in FIG. 3 are described below with respect to the components and diagrams of FIGS. 1A through 2.

For example, FIG. 3 shows that a method from the perspective of application 120 can comprise an act 300 of sending a data access request. Act 300 includes sending one or more access requests for data corresponding to one or more different type structures. For example, as shown in FIG. 1B, application 120 sends access request 180 to processing module 105. Request 180, in turn, involves access or otherwise manipulation of some data maintained by another application (e.g., 125) that is using another type structure (or ill-defined type structure).

FIG. 3 also shows that the method from the perspective of the application 120 can comprise an act 310 of receiving a data structure that maps the data to a common data structure. Act 310 includes receiving one or more data structures that comprise mapping information between the requested data and a common data structure. For example, as shown in FIG. 1B, upon receiving the access request 180, processing module 105 sends one or more messages 185 to initiate proxy 170. Proxy 170 then traverses the data structures in application 125 to identify the various data shapes to the extent they can be identified, and returns a mapped data structure 195 that correlates the requested data with the common data structure 110.

In addition, FIG. 3 shows that the method from the perspective of application 120 can comprise an act 320 of performing operations on the requested data through the received data structures. Act 320 includes requesting one or more actions on the one or more data structures, wherein the requested one or more operations are translated to the one or more different type structures. As shown in FIG. 2 for example, application 120 sends request 200 to processing module 105, which includes a request to change data element E to E' in data structure 195. This request is then translated through the mapped data structure 195 and message 240, and subsequently processed through application 125.

Furthermore, FIG. 3 shows the method from the perspective of application 120 can comprise an act 330 of confirming that the operation is completed. Act 330 includes receiving one or more confirmations that the requested one or more operations have been completed on the requested data corresponding to the one or more different type structures. For example, FIG. 2 shows that application 125 sends one or more confirmation responses 250 back to the application 120 confirming that a record corresponding to data element E has changed to E'.

In addition to the foregoing, FIG. 3 illustrates that a method from the perspective of the overall system 100 can comprise an act 340 of receiving an access request for data corresponding to a different type structure. Act 340 includes receiving one or more access requests from an application for data maintained by one or more different applications, wherein the requested data correspond to one or more different type structures. For example, FIG. 1B shows the system 100, via processing module 105, receives a request 180 from application program 120 to access data in application 125. In this particular case, while at least one of the data elements are defined for application 125, some of the other data elements have no particular structural type and only a data shape (e.g., data element E).

FIG. 3 also shows that the method from the perspective of system 100 can comprise an act 350 of identifying a corresponding proxy for the different type structure. Act 350 includes identifying one or more proxies corresponding to the one or more different application programs. For example, FIG. 1B shows that processing module 105, upon receiving request 180, identifies in registry 115 that proxy 170 correlates with application program 125, and sends one or more requests 185 to initiate proxy 170.

In addition, FIG. 3 shows that the method from the perspective of system 100 can comprise an act 360 of mapping the requested data to a common data structure. Act 360 includes mapping the requested data to a common data structure using the identified one or more proxies, wherein the identified one or more proxies create a mapped data structure. For example, proxy 170 traverses the data elements, and, for example, identifies which data shapes correspond to which structural types in the common data structure 110. The proxy 170 then creates a data structure 195 that comprises mapping information that correlates (or assigns) the requested data elements to the structural types of the common data structure.

Furthermore, FIG. 3 shows that the method from the perspective of system 100 comprises an act 370 of sending a data structure that includes mapping information to the common data structure. Act 370 includes providing the mapped data structure to the requesting application. For example, as shown in FIG. 1B, processing module 105 sends mapped data structure 195 to application 120. As previously discussed, application 120 can then manipulate any of the data in application 125 that are appropriately mapped in the mapped data structure 195.

Accordingly, FIGS. 1-3 and the corresponding text provide a number of components and mechanisms for ensuring that a wide range of applications can access each other's data, even though they may be built on different type frameworks. As previously mentioned, at least one advantage of the present invention is that developers can rely primarily on considerations for data shape, rather than specific type conventions. This focus on data shape, rather than sometimes changing type conventions, enables applications built on older or newer type frameworks to still enjoy considerable operation.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a system of a computerized environment comprising one or more application programs using one or more data elements that correspond to different type structures based on different data shapes, a method of automatically providing applications with access to data in different structural types using an intermediate common data structure, such that applications using different structural types are interoperable, comprising the acts of:
   receiving an access request from a requesting application, the access request requesting data maintained by a different application, wherein the requesting application expects the requested data to correspond to a first type structure, and wherein the different application maintains the requested data in a different type structure;
   identifying a proxy corresponding to the different application;
   sending one or more requests to initiate the identified proxy;
   the proxy traversing one or more data elements maintained by the different application;
   the proxy identifying a shape of each of the one or more data elements maintained by the different application and identifying a structural type within a common data structure corresponding to each identified shape;
   the proxy returning a mapped data structure that correlates the requested data with the common data structure using the identified shapes and corresponding structural types;
   mapping the requested data in the different type structure to the common data structure using the identified proxy; and
   providing the mapped data structure to the requesting application so that the requesting application can access and modify the requested data using the common data structure without the application having knowledge of the different type structure used by the different application.

2. The method as recited in claim 1, wherein the proxy is provided by the different application.

3. The method as recited in claim 1, wherein the proxy is a default provided by the system.

4. The method as recited in claim 1, further comprising an act of assigning one of a plurality of structural types in the common data structure to the requested data.

5. The method as recited in claim 4, further comprising an act of identifying one or more data shapes for the requested data in the different application.

6. The method as recited in claim 4, wherein the common data structure comprises a structural type for an operation, a structural type for a sequence, a structural type for a record, and a structural type for an atom corresponding to data having an unrecognizable data shape.

7. The method as recited in claim 6, wherein mapping the requested data further comprises the acts of:
   determining that one of the one or more data shapes corresponds to an argument or function that returns a value; and
   assigning requested data corresponding to the one data shape to an operation structural type.

8. The method as recited in claim 6, wherein mapping the requested data further comprises the acts of:
   determining that at least some of the requested data corresponds to a data shape that is undefined; and
   assigning the at least some data to a structural type for undefined data shapes.

9. The method as recited in claim 6, wherein mapping the requested data further comprises the acts of determining that one of the one or more data shapes corresponds to a collection of values.

10. The method as recited in claim 9, further comprising the acts of:
    determining that the collection of values has no identifiable labels; and
    assigning the collection of data to a sequence structural type.

11. The method as recited in claim 9, further comprising the acts of:
    determining that the collection of values has one or more identifiable labels; and
    assigning the collection of data to a record structural type.

12. The method as recited in claim 1, further comprising an act of:
    receiving one or more requests to perform one or more operations on at least some of the requested data; and
    processing the one or more operations through the mapped data structure.

13. A computer program product for use in a system of a computerized environment comprising one or more application programs using one or more data elements that correspond to different type structures based on different data shapes, the computer program product comprising one or more data storage devices having computer-executable instructions stored thereon that, when executed, cause one or more processors in the system to perform the method of claim 1.

* * * * *